(12) United States Patent
Iwamoto

(10) Patent No.: US 7,437,536 B2
(45) Date of Patent: Oct. 14, 2008

(54) SYSTEMS AND METHODS FOR TASK MIGRATION

(75) Inventor: Tatsuya Iwamoto, Austin, TX (US)

(73) Assignee: Sony Computer Entertainment Inc. (JP)

( * ) Notice: Subject to any disclaimer, the term of this patent is extended or adjusted under 35 U.S.C. 154(b) by 744 days.

(21) Appl. No.: 10/838,050

(22) Filed: May 3, 2004

(65) Prior Publication Data

US 2005/0251667 A1  Nov. 10, 2005

(51) Int. Cl.
*G06F 9/40* (2006.01)
(52) U.S. Cl. .................................. 712/200; 712/228
(58) Field of Classification Search ................. 712/220, 712/233, 228, 223; 711/202, 203, 5, 2, 6, 711/209
See application file for complete search history.

(56) References Cited

U.S. PATENT DOCUMENTS

| | | | | |
|---|---|---|---|---|
| 5,189,733 A | * | 2/1993 | Bennett et al. | 711/170 |
| 5,504,901 A | * | 4/1996 | Peterson | 717/144 |
| 5,655,132 A | * | 8/1997 | Watson | 718/104 |
| 5,797,014 A | * | 8/1998 | Gheith | 717/163 |
| 5,822,787 A | * | 10/1998 | Zucker | 711/213 |
| 6,324,689 B1 | * | 11/2001 | Lowney et al. | 717/154 |
| 6,625,718 B1 | * | 9/2003 | Steiner | 711/220 |
| 6,728,962 B1 | * | 4/2004 | Chalmer et al. | 718/108 |
| 6,901,584 B2 | * | 5/2005 | Shann | 717/140 |
| 7,086,049 B2 | * | 8/2006 | Goodman | 717/168 |

FOREIGN PATENT DOCUMENTS

| | | |
|---|---|---|
| JP | 06-501122 | 2/1994 |
| JP | 06-110685 | 4/1994 |
| JP | 09-146904 | 6/1997 |
| JP | 2001-505340 | 4/2001 |

OTHER PUBLICATIONS

Office Action dated Jun. 26, 2007, Japanese Application No. 2005-130463 (translation).

* cited by examiner

*Primary Examiner*—Eric Coleman
(74) *Attorney, Agent, or Firm*—Lerner, David, Littenberg, Krumholz & Mentlik, LLP

(57) ABSTRACT

Methods and systems are provided whereby, in one aspect, pointers to address locations of instructions, static data and dynamically-created data are stored such that the instructions, static data and dynamically-created data can be moved to a different memory or processor without changing the values of the pointers.

27 Claims, 8 Drawing Sheets

FIG. 4

| | | Physical Address | |
|---|---|---|---|
| 669 → | | 0 | Other programs and data |
| | | ... | |
| | | 499 | |
| 670 → | | 500 | Branch-jump-stub routine |
| | | | Calculate and store return offset |
| | | | Unmask interrupt |
| | | | Calculate physical address of target routine |
| | | ... | Jump to physical address of target routine |
| 671 → | | 550 | Return-jump-stub routine |
| | | | Calculate physical return address |
| | | | Unmask interrupt |
| | | ... | Jump to physical return address |
| 672 → | | | Other programs and data |
| | | 999 | |
| 610 → | Instructions | 1000 | Instructions Start |
| | | ... | |
| 700 → | | 1400 | Branch-jump-stub instruction (Target Offset = 600) |
| 705 → | | 1401 | Move Ax, Car Array (Offset 2005) Element 2 |
| | | ... | |
| 710 → | | 1600 | Target Routine Instructions Start |
| | | ... | ... |
| 720 → | | 1610 | Return-jump-stub instruction |
| | | ... | |
| | | 1999 | Instructions End |
| | | 2000 | |
| 620 → | | ... | Statically Allocated Data |
| | | 2999 | |
| 630 → | Heap | 3000 | Information created by Instructions |
| | | ... | ... |
| 631 → | | 3005 | Car Array |
| | | 3006 | Car 1 Pointer = 2100 |
| 632 → | | 3007 | Car 2 Pointer = 2200 |
| | | 3008 | Car 3 Pointer = 2300 |
| | | ... | |
| 635 → | | 3100 | Car 1 Track Position |
| | | ... | Car 1 Color |
| | | 3199 | ... |
| 636 → | | 3200 | Car 2 Track Position |
| | | ... | Car 2 Color |
| | | 3299 | ... |
| 637 → | | 3300 | Car 3 Track Position |
| | | ... | Car 3 Color |
| | | 3399 | ... |
| 638 → | | 3400 | |
| | | ... | Other information created by Instructions |
| | | 3999 | |
| | | 4000 | Stack(s) |
| 640 → | | ... | |
| | | 4999 | |

FIG. 5

| | Register Name | Value |
|---|---|---|
| 800 → | Global Base | 1000 |
| 810 → | Jump Address | 600 |
| 820 → | Interrupt Mask | False |
| 830 → | Return Address | 401 |

SYSTEMS AND METHODS FOR TASK MIGRATION

BACKGROUND OF THE INVENTION

In a typical program running on a processor, the program requires the use of memory for a variety of purposes. One purpose is to store the instructions that constitute the program itself. A second purpose is to hold static data, that is, data that is supplied with the program. For example, a racing game's static data may comprise the layout of a race track.

Another purpose is to hold data that is created by the program as it executed. This type of data, which may include data known as dynamically allocated data or the heap, typically holds information which is not known in advance when the program is written. For example, in a game, the player may be provided with the ability to build virtual cars having characteristics selected by the player. Since neither the cars' characteristics nor the number of cars may be known until the program is actually executed by a player, the information cannot be stored in advance. Accordingly, this data will created by the program during its execution.

Yet another purpose of memory is store stacks used by a program. Stacks may be used for many different purposes. For example, because programs typically contain many different routines, different executions of the program may require that the routines be executed in different orders. One stack may keep track of the order in which routines are executed so that the processor can return to a prior routine after the current routine is over. Similarly, the same or a different stack may be used to temporarily store the data associated with one routine while new data is being created and used by another routine.

As is apparent, the efficient execution of a program thus requires the processor to know where all of this information is stored. If the processor needs to jump from one instruction to another, it needs to be able to locate the next instruction. Similarly, it needs to be able to find the statically allocated data, dynamically allocated data, and the stacks.

For this reason, programs typically use addressable memory. Addressable memory allocates memory into individual units having some sort of identifier—typically a number called an "address"—which allows the program to find the instruction or data based on the address. Accordingly, if the processor receives the instruction such as "JUMP 100," the processor would retrieve and then execute the instruction at address 100.

One of the difficulties associated with a program's use of addresses and access of data is that programs often do not know ahead of time exactly where they will be stored in memory. For example, if a program and its data were stored at addresses 1000 through 2000 the last time it was executed, there is no guarantee that those addresses will be available the next time the program is executed. Thus, the same program may be stored at addresses 3500-4500 the next time it is loaded.

Accordingly, some programs use position independent code (PIC). In PIC, the jump instructions in the program do not recite the actual physical address of the instruction to jump to. Rather, they use a different value, known as a relative address, which is used to calculate or determine the physical address of the instruction to jump to. For example, the instruction "JUMP 100" does not refer to the instruction stored at address 100 in memory. Rather, it may refer to the instruction that is 100 addresses away from the physical address of the beginning of the program.

Systems using PIC convert the relative addresses to actual physical addresses in a number of ways. For example, the physical addresses may be determined at the time the program is loaded into memory, in which case the relative addresses are converted to physical addresses as the program is stored in memory. Alternatively, when a jump instruction is encountered while the program is executing, the processor may calculate the physical address by adding the relative address to a base address that is stored in one of the processor's registers.

One of the difficulties with PIC systems is that they do not adequately address the needs of multi-processing systems. In multi-processor systems, a plurality of sub-processors can operate in parallel (or at least in concert) to achieve desired processing results. Multi-processing systems typically have the ability to migrate programs to be performed from one processor to another.

When a program is migrated from one processor to another in a multi-processing system, it often occurs when the program in the middle of being executed. However, PIC systems are not tailored for such mid-processing moves. Once a PIC program is loaded in memory, its physical address location is known. Accordingly, address pointers to and within data created after the program is loaded and running typically point to physical address locations. Therefore, it is difficult to move all of information associated with a running PIC program to another memory location. Moreover, such programs are susceptible to interrupts in connection with the move.

Accordingly, there is a need for a system and method which permits a more advantageous movement of both programs (including their static data) and the dynamically created data to different processors or address locations.

SUMMARY OF THE INVENTION

In one aspect, a method of processing a task is provided. The steps include providing instructions stored in addressable memory; providing a base value related to the addresses at which the instructions are stored; providing a jump instruction to a target instruction wherein the jump instruction includes a parameter value; processing the jump instruction by jumping to a routine stored in the memory in which the instructions are stored, wherein the routine comprises the steps of: (a) determining the address of the target instruction based on the parameter value and base value and (b) jumping to the physical address of the target instruction.

In this regard, the method preferably includes: conditional and conditional jump instructions; storing the base value in a register, the base value being dependant upon the physical address location of one or more of the instructions; providing a task image comprising the instructions, dynamic data created in response to the execution of the instructions, and other data, wherein the base value is dependant upon the lowest physical first address of the task; storing a mask value indicating whether the instructions may be moved to another memory location; masking an interrupt request to move the task during the steps of jumping to a routine stored in the memory and determining the address of the target instruction and unmasking the interrupt request after the steps of jumping to a routine stored in the memory and determining the address of the target instruction, and; determining the address of the target instruction by summing the parameter value and base value.

Another aspect of the invention relates to a method of processing a task comprising: providing instructions stored in addressable memory, wherein the instructions comprise a jump instruction to a target routine, a return instruction within the target routine, and a subsequent instruction to be executed after the target routine is executed; providing a first base value related to the addresses at which the instructions are stored; processing the jump instruction by determining a return value based on the base value and address of the jump instruction, storing the return value, determining the address of the target instruction based on the parameter value and base value, and jumping to the address of the target routine; changing the addresses at which the instructions are stored and storing a second base value related to the changed addresses, and; after the addresses of the instruction are changed, processing the return instruction by determining the address of the subsequent instruction based on the return value and the second base value and jumping to the address.

Optionally, the method further includes: determining the return offset by subtracting the base value from the parameter; preventing the step of changing the addresses at which the instructions are stored during the step of processing the jump instruction by masking an interrupt request to change the address location of the instructions.

The method preferably also includes: providing a first data base value different from the first and second base value; creating dynamic data in response to the execution of the instructions, wherein pointers to the data are stored as offsets from the first data base value; changing the addresses at which the dynamic data is stored but not the values of the pointers; storing a second data base value related to the changed addresses; after the addresses of the dynamic data are changed, processing the data access instructions by determining the address of the data based on the pointer value and the second data base value.

An aspect of the invention also provides a system for processing a task comprising: a plurality of sub-processing units; instructions executable by the sub-processing unit; a global base address register for each sub-processing unit, the global base address register storing a global base value; static data comprising data accessed by a sub-processing unit in response to the instructions and whose values are stored prior to the execution of the instructions; dynamic data comprising data accessed by a sub-processing unit in response to the instructions and whose values are not stored prior to the execution of the instructions; jump instructions having parameters, wherein the parameters are independent of the physical address of the instruction to jump to; data pointers having parameters, wherein the parameters are independent of the physical address of the data to be accessed; wherein the jump instructions and data pointers are resolved based on the parameters and the global address value, and wherein moving the instructions from one processor to another processor comprises changing the global base value but not the parameters.

Such a system preferably further includes a return address register for storing a value related to an address to return to after execution of a routine that was jumped to. The system may also include an interrupt mask value indicating whether the memory address of the instructions can be changed. The instructions may stored in a local memory uniquely associated with the sub-processing unit, and the dynamic data may include a heap and a stack. Preferably, at least some of the pointers are stored as parameters in data access instructions and at least some of the pointers are stored in the dynamic data. In this regard, all of the data pointers created in response to execution of the instructions may contain parameters that are independent of the physical address of the data to be accessed.

Yet another method in accordance with the invention comprises: storing instructions in an addressable memory accessible by a first processor, the instructions having a first subset of instructions and a second subset of instructions whereby the second subset of instructions access data created by the first subset; storing a first base value that is related to the physical addresses in which the instructions are stored; the first processor executing the first subset of the instructions and creating dynamic data in response to such execution, wherein the dynamic data includes a pointer value pointing to target dynamic data; the first processor accessing the target dynamic data by determining the physical address of the target data based on the first base value and the pointer value; after the first subset of instructions are executed, storing the instructions and dynamic data in an addressable memory accessible by a second processor without changing the pointer values, and; the second processor executing the second subset of instructions and accessing the target dynamic data based on the second base value and the pointer value.

Another aspect of the invention relates to system comprising: instructions stored in addressable memory; memory storing a base value related to the addresses at which the instructions are stored; memory storing a jump instruction to a target instruction wherein the jump instruction includes a parameter value; means for processing the jump instruction by jumping to a routine stored in the memory in which the instructions are stored, wherein the routine comprises the steps of: (a) determining the address of the target instruction based on the parameter value and base value and (b) jumping to the physical address of the target instruction.

Optionally, the system may include a register for storing the base value, where the base value is dependent upon the physical address location of one or more of the instructions. It may also include a task image including the instructions, dynamic data created in response to the execution of the instructions, and other data, and wherein the base value is dependant upon the lowest physical first address of the task. It may further include a mask value indicating whether the instructions may be moved to another memory location. In addition, it may include means for unmasking an interrupt request after the steps of jumping to a routine stored in the memory and determining the address of the target instruction.

Yet another system in accordance with an aspect of the invention includes: instructions stored in addressable memory, wherein the instructions comprise a jump instruction to a target routine, a return instruction within the target routine, and a subsequent instruction to be executed after the target routine is executed; means for providing a first base value related to the addresses at which the instructions are stored; means for processing the jump instruction by determining a return value based on the base value and address of the jump instruction, storing the return value, determining the address of the target instruction based on the parameter value and base value, and jumping to the address of the target routine; and means for changing the addresses at which the instructions are stored and storing a second base value related to the changed addresses, such that after the addresses of the instruction are changed, the return instruction is processed by determining the address of the subsequent instruction based on the return value and the second base value and jumping to the address.

The system may be such that: the return offset is determined by subtracting the base value from the parameter; means are provided for preventing the step of changing the addresses at which the instructions are stored during the step of processing the jump instruction; and the means for preventing includes means for masking an interrupt request to change the address location of the instructions. The system may also include: means for providing a first data base value different from the first and second base value; means for creating dynamic data in response to the execution of the instructions, wherein pointers to the data are stored as offsets from the first data base value; means for changing the addresses at which the dynamic data is stored but not the values of the pointers; means for storing a second data base value related to the changed addresses, and; means for processing the data access instructions by determining the address of the data based on the pointer value and the second data base value after the addresses of the dynamic data is changed.

Still another aspect of the system includes a system for processing tasks comprising:

a first processor;

a first memory associated with the first processor;

a first base register containing a value related to the physical address location of the task image when loaded in the first memory;

a second processor;

a second memory associated with the second processor;

a second base register containing a value related to the physical address location of the task image when loaded in the second memory;

a task image comprising jump instructions having parameters, data access instructions having parameters, static data created prior to execution of the instructions by the first processor, a heap created in response to execution of the instructions by the first processor and comprising parameters, and a stack, wherein the parameters depend on the location of instructions or data; and an address resolution routine executed in response to the execution of a jump instruction or data access instruction, the address resolution routine for determining a physical address based on the register value associated with the processor executing the instructions or accessing the data, and the parameter of the jump instruction or data access instruction;

a third processor for copying the task image, including the parameter values as stored in the first memory, from the first memory to the second memory in response to an interrupt request.

This system may further include an interrupt mask register containing a mask value indicating whether the task image may be copied from the first memory to the second processor in response to an interrupt, wherein the interrupt is masked during at least a portion of the address resolution routine. It may also be such that the address resolution routine further includes instructions for calculating a return value based on the address of the jump instruction and the value of the first or second base register depending on whether the first or second processor is executing the jump instruction. In such an instance, the system preferably includes a return address resolution routine executed in response to the execution of a return instruction for determining the physical address of the instruction to be executed after the jump instruction, the physical address being determined based on the return value and the value of the first or second base register depending on whether the first or second processor is executing the return instruction.

Other aspects, features, and advantages of the present invention will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the invention is not limited to the precise arrangements and instrumentalities shown.

FIG. 4 is a schematic diagram of sample memory values in accordance with an aspect of the present invention.

FIG. 5 is a schematic diagram of registry values in accordance with an aspect of the present invention.

DETAILED DESCRIPTION OF THE PREFERRED EMBODIMENTS

Figure 1:
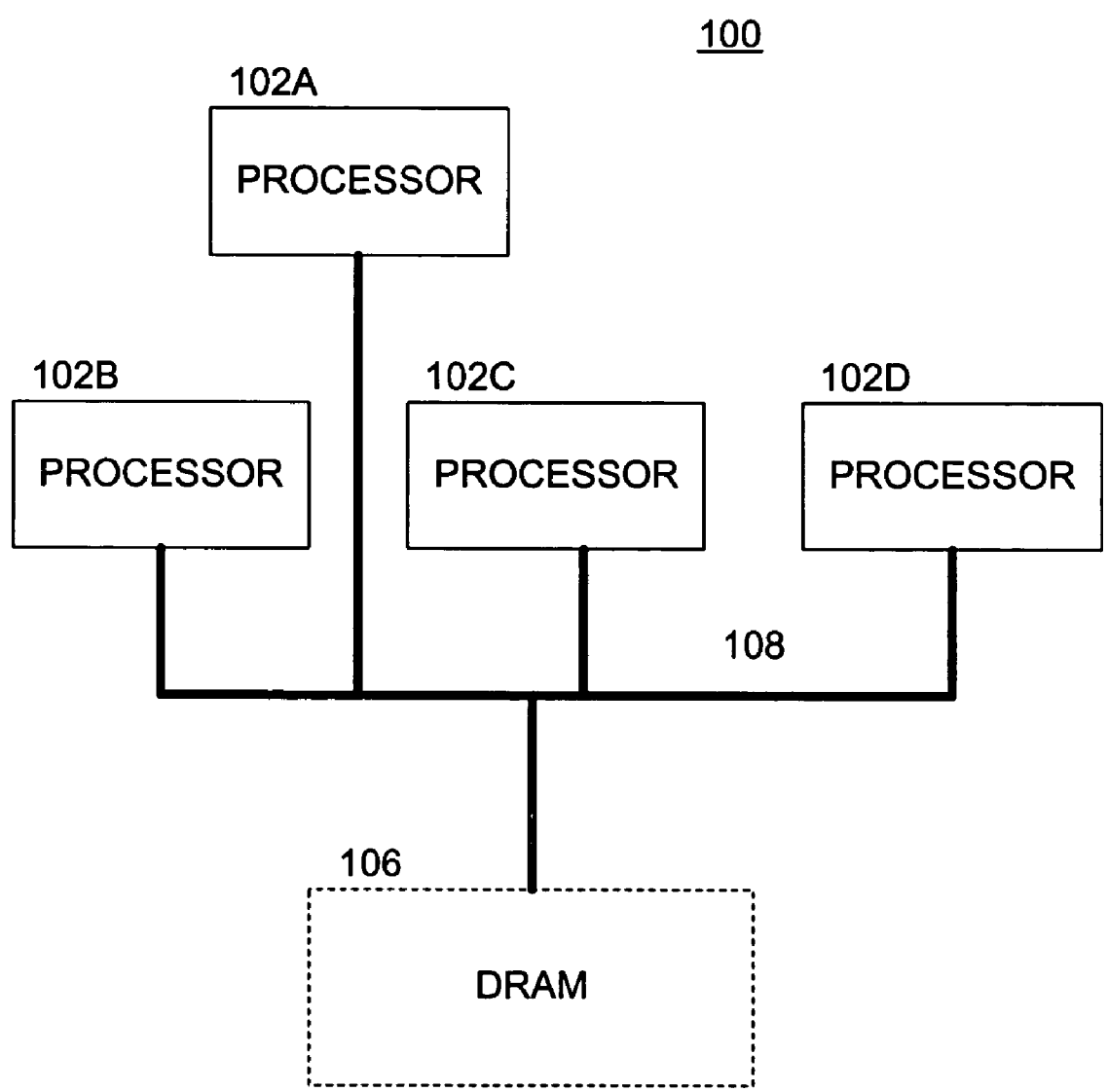
FIG. 1 is a diagram illustrating the structure of a multi-processing system in accordance with one or more aspects of the present invention.

With reference to the drawings, where like numerals indicate like elements, there is shown in FIG. 1 a multi-processing system 100 in accordance with the present invention. The multi-processing system 100 includes a plurality of processors 102 (any number may be used) coupled to a shared memory 106, such as a DRAM, over a bus 108. It is noted that the shared DRAM memory 106 is not required (and thus is shown in dashed line). Indeed, one or more of the processing units 102 may employ its own memory (not shown) and have no need for the shared memory 106.

One of the processors 102 is preferably a main processing unit, for example, processing unit 102A. The other processing units 102 are preferably sub-processing units (SPUs), such as processing unit 102B, 102C, 102D, etc. The processing units 102 may be implemented using any of the known computer architectures. All of the processing units 102 need not be implemented using the same architecture; indeed they may be of heterogeneous or homogenous configurations. In operation, the main processing unit 102A preferably schedules and orchestrates the processing of data and applications by the sub-processing units 102B-D such that the sub-processing units 102B-D perform the processing of these data and applications in a parallel and independent manner.

It is noted that the main processing unit 102A may be disposed locally with respect to the sub-processing units 102B-D, such as in the same chip, in the same package, on the same circuit board, in the same product, etc. Alternatively, the main processing unit 102A may be remotely located from the sub-processing units 102B-D, such as in different products, which may be coupled over a bus, a communications network (such as the Internet) or the like. Similarly, the sub-processing units 102B-D may be locally or remotely located from one another.

From time to time, one or more of the sub-processing units 102B-D may exhibit a hard processor error, for example, a recoverable error that does not involve operating system errors or kernel errors. To this end, the main processing unit 102A is preferably operable to perform other managerial functions that permit the continuation of executing the processor tasks without having to re-execute the processor tasks that have been executed by the sub-processing unit 102B-D (prior to the error) from the beginning. Preferably, the managerial functions of the main processing unit 102A operate to ensure that real-time (and/or multi-media) processing objectives are met even in the event of a recoverable error in one or more of the sub-processing units 102B-D.

These further managerial functions include monitoring the processor tasks (and/or the associated processor loads for those tasks) that are allocated to be performed by the respective sub-processing units 102B-D. The main processing unit 102A may also detect whether a processing error has occurred in a given one of the sub-processing units, and re-allocate all of the processor tasks of the given sub-processing unit to one or more participating sub-processing units. This re-allocation is preferably carried out based on the processor loads of the processor tasks of the given sub-processing unit and the processor loads of the participating sub-processing units. These and other aspects of the present invention will be discussed in more detail later in this description.

In accordance with a preferred computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

The basic processing module is a processor element (PE). In this regard, reference is made to FIG. 2, which is block diagram of a basic processing module or processor element (PE) 200. As shown in this figure, PE 200 comprises an I/O interface 202, a processing unit (PU) 204, a direct memory access controller (DMAC) 206, and a plurality of sub-processing units 208, namely, sub-processing unit 208A, sub-processing unit 208B, sub-processing unit 208C, and sub-processing unit 208D. A local (or internal) PE bus 212 transmits data and applications among the PU 204, the sub-processing units 208, the DMAC 206, and a memory interface 210. The local PE bus 212 can have, e.g., a conventional architecture or can be implemented as a packet switch network. Implementation as a packet switch network, while requiring more hardware, increases available bandwidth.

The PE 200 can be constructed using various methods for implementing digital logic. The PE 200 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 200 also could be implemented using superconducting material, e.g., rapid single-flux-quantum (RSFQ) logic.

The PE 200 is closely associated with a dynamic random access memory (DRAM) 214 through a high bandwidth memory connection 216. The DRAM 214 functions as the main memory for the PE 200. Although the DRAM 214 preferably is a dynamic random access memory, the DRAM 214 could be implemented using other means, e.g., as a static random access memory (SRAM), a magnetic random access memory (MRAM), an optical memory, a holographic memory, etc. The DMAC 206 and the memory interface 210 facilitate the transfer of data between the DRAM 214 and the sub-processing units 208 and the PU 204 of the PE 200. It is noted that the DMAC 206 and/or the memory interface 210 may be integrally or separately disposed with respect to the sub-processing units 208 and the PU 204. Indeed, instead of a separate configuration as shown, the DMAC 206 function and/or the memory interface 210 function may be integral with one or more (preferably all) of the sub-processing units 208 and the PU 204.

The PU 204 can be, e.g., a standard processor capable of stand-alone processing of data. and applications. In operation, the PU 204 schedules and orchestrates the processing of data and applications by the sub-processing units. The sub-processing units preferably are single instruction, multiple data (SIMD) processors. Under the control of the PU 204, the sub-processing units perform the processing of these data and applications in a parallel and independent manner. The DMAC 206 controls accesses by the PU 204 and the sub-processing units 208 to the data and applications stored in the shared DRAM 214. It is noted that the PU 204 may be implemented by one of the sub-processing units 208 taking on the role of a main processing unit that schedules and orchestrates the processing of data and applications by the sub-processing units 208.

In accordance with this modular structure, the number of PEs 200 employed by a particular computer system is based upon the processing power required by that system. For example, a server may employ four PEs 200, a workstation may employ two PEs 200 and a PDA may employ one PE 200. The number of sub-processing units of a PE 200 assigned to processing a particular software cell depends upon the complexity and magnitude of the programs and data within the cell. In an alternative configuration, the PE may include multiple PUs. Each of the PUs may include one or more SPUs.

Figure 3:
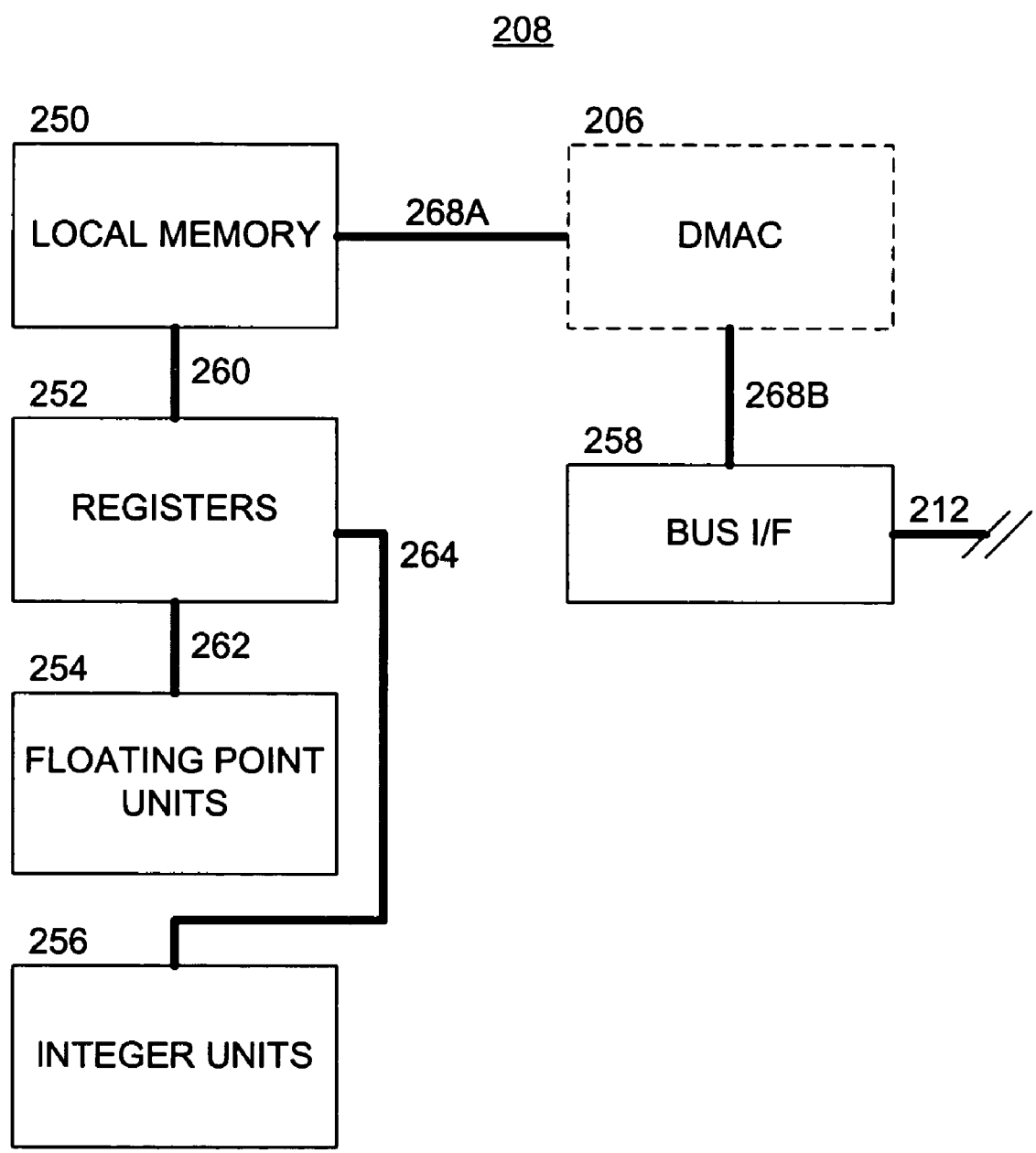
FIG. 3 is a diagram illustrating the structure of an exemplary sub-processing unit (SPU) in accordance with an aspect of the present invention.

FIG. 3 illustrates the preferred structure and function of a sub-processing unit 208. The sub-processing unit 208 includes local memory 250, registers 252, one or more floating point units 254 and one or more integer units 256. Preferably, each sub-processing unit 208 has its own unique local memory 250. Again, however, depending upon the processing power required, a greater or lesser number of floating points units 254 and integer units 256 may be employed. In a preferred embodiment, the local memory 250 contains 256 kilobytes of storage, and the capacity of registers 252 is 128×128 bits. The floating point units 254 preferably operate at a speed of 32 billion floating point operations per second (32 GFLOPS), and the integer units 256 preferably operate at a speed of 32 billion operations per second (32 GOPS).

The local memory 250 may or may not be a cache memory. The local memory 250 is preferably constructed as a static random access memory (SRAM). A PU 204 may require cache coherency support for direct memory accesses initiated by the PU 204. Cache coherency support is not required, however, for direct memory accesses initiated by the sub-processing units 208 or for accesses from and to external devices.

Figure 2:
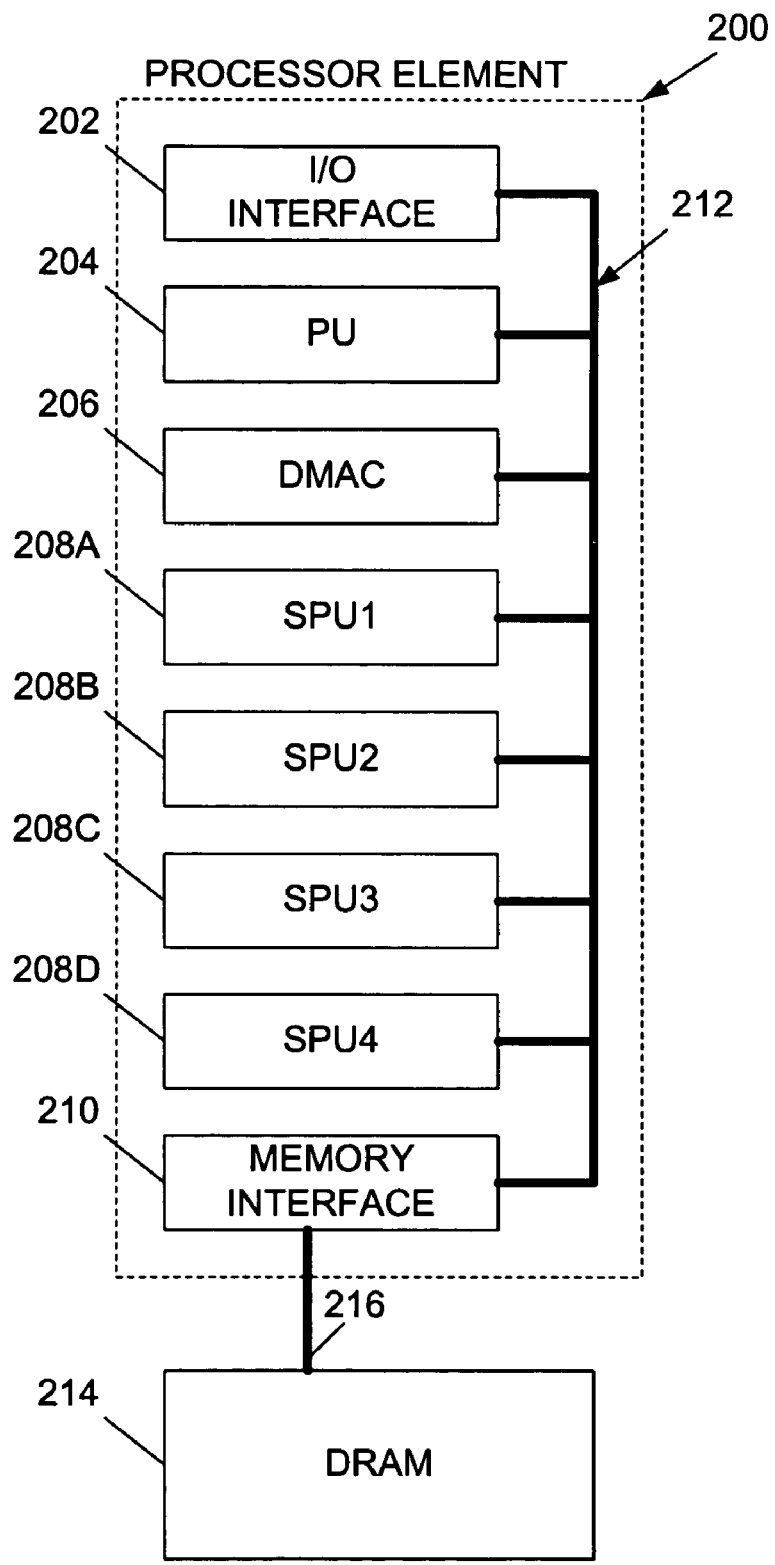
FIG. 2 is a diagram illustrating a preferred structure of a processor element (PE) in accordance with an aspect of the present invention.

The sub-processing unit 208 further includes a bus interface (I/F) 258 for transmitting applications and data to and from the sub-processing unit 208. In a preferred embodiment, the bus I/F 258 is coupled to a DMAC 206, which is shown in dashed line to indicate that it may be integrally disposed within the sub-processing unit 208 as shown or may be externally disposed (as shown in FIG. 2). A pair of busses 268A, 268B interconnect the DMAC 206 between the bus I/F 258 and the local memory 250. The busses 268A, 268B are preferably 256 bits wide.

The sub-processing unit 208 further includes internal busses 260, 262 and 264. In a preferred embodiment, the bus 260 has a width of 256 bits and provides communications between the local memory 250 and the registers 252. The busses 262 and 264 provide communications between, respectively, the registers 252 and the floating point units 254, and the registers 252 and the integer units 256. In a preferred embodiment, the width of the busses 264 and 262 from the registers 252 to the floating point or the integer units is 384 bits, and the width of the busses 264 and 262 from the floating point or the integer units 254, 256 to the registers 252 is 128 bits. The larger width of these busses from the registers 252 to the floating point or the integer units 254, 256 than from these units to the registers 252 accommodates the larger data flow from the registers 252 during processing. A maximum of three words are needed for each calculation. The result of each calculation, however, normally is only one word.

Further information relating to a multi-processing systems which may be used in connection with the current invention are described in U.S. Pat. No. 6,526,491, which is incorporated herein by reference with respect to its discussion of multi-processing systems and any other disclosures.

When a task is being executed by a processor, the task is typically loaded in local memory 250. A task often uses the memory for a variety of purposes, including storage of the instructions and data. Such instructions and data associated with a particular task tend to fall into four different categories as shown in FIG. 4. Not every task will involve all four categories, and not every use of memory by a task will fall into one of the four categories. Moreover, although the categories are shown in the figure as occupying contiguous and adjacent areas of memory for ease of understanding, the occupied areas of memory are not necessarily contiguous. A particular area of memory may also fall into two different categories; for example, the instructions may create stacks that are stored in the heap. Accordingly, FIG. 4 is solely used for the purpose of illustrating one possible and typical configuration of task memory management, and the discussions of the categories do not represent the limits of the present invention.

The first category 610 includes the instructions to be executed in connection with the task. Those instructions may include instructions to perform mathematical equations, move memory and other operations. For the purposes of illustration, it shall be assumed that the program category occupies the memory addresses between and including 1000 and 1999.

In one aspect of the invention, one of those instructions will be a branch-jump-stub instruction 700. In the absence of a jump instruction, program instructions 610 are typically executed in sequential order. A branch or jump instruction causes the processor to execute instructions in non-sequential order. Similarly, branch-jump-stub instruction 700 contains information used to identify the next instruction or set of instructions (hereafter, the "target routine") to be executed by the processor. The branch-jump-stub instruction may also be conditional or unconditional. However, the branch-jump-stub instruction does not identify the physical address of the next instruction targeted for execution. Rather, the branch-jump-stub instruction identifies a parameter whose value is a target offset. The target offset defines a value which may be used in conjunction with other information to determine the physical address of the next instruction to be executed. The branch processing and offset calculation is preferably performed by the SPU and, in particular, may be but is not necessarily performed by the integer unit.

Preferably, the physical address of the target of a branch-jump-stub instruction is calculated by adding the target offset value to a value stored in one of the registers 252 for the purpose of resolving physical address determinations. As shown in FIG. 5, global base register 800 may be used for such purpose. It is also preferable for the global address value to be equal to the lowest physical address of a task, including its instructions, static data or dynamic data. In this regard, global base register 800 is shown storing a global base value of 1000 which is equal to the lowest physical address of the task image including its instructions 610 and its associated data as described below.

The second category 620 constitutes statically allocated data. For the purposes of illustration, it shall be assumed that the statically allocated data category occupies the memory addresses between and including 2000 to 2999. Static data is generally used for the purpose of storing data that may be used by the instructions 610 and known prior to execution.

Heap 630, on the other hand, includes dynamically allocated data. A portion of the memory is allocated to data that is created by the task as it executes. For the purposes of illustration, it shall be assumed that the heap occupies the memory addresses between and including 3000 and 3999.

Another category is the stack 640. Like the heap 630, the stack is used to store information created by the task as it runs. However, the stack is most often used to store data relating to subroutine calls. In this regard, the stack will store the values of parameters and returned values passed to functions, but can store other data as well. For the purposes of illustration, it shall be assumed that one or more stacks occupy the memory addresses between and including 4000 and 4999.

As shown in FIG. 5, one or more of the registers 252 are used in accordance with an aspect of the invention. Typically, jump address registers are used to store the absolute or relative address of an instruction to jump to. However, in accordance with an aspect of the system, jump register 810 is used to store a target offset value. Return address register 830 stores information which may be used to determine the physical address at which execution should resume after returning from a branch-jump-stub instruction. Interrupt mask register 820 is used to store an interrupt mask value. The interrupt mask value indicates whether the SPU 208 is ready to perform an interrupt request to move the task image 680 to another SPU or memory location within memory 250. The purpose of global base address register 800 is discussed further below. Although the registers are shown as belonging to register bank 252, the values may be stored in a memory location accessible to the SPU or other processor executing the instructions and accessing the data.

Figure 7:
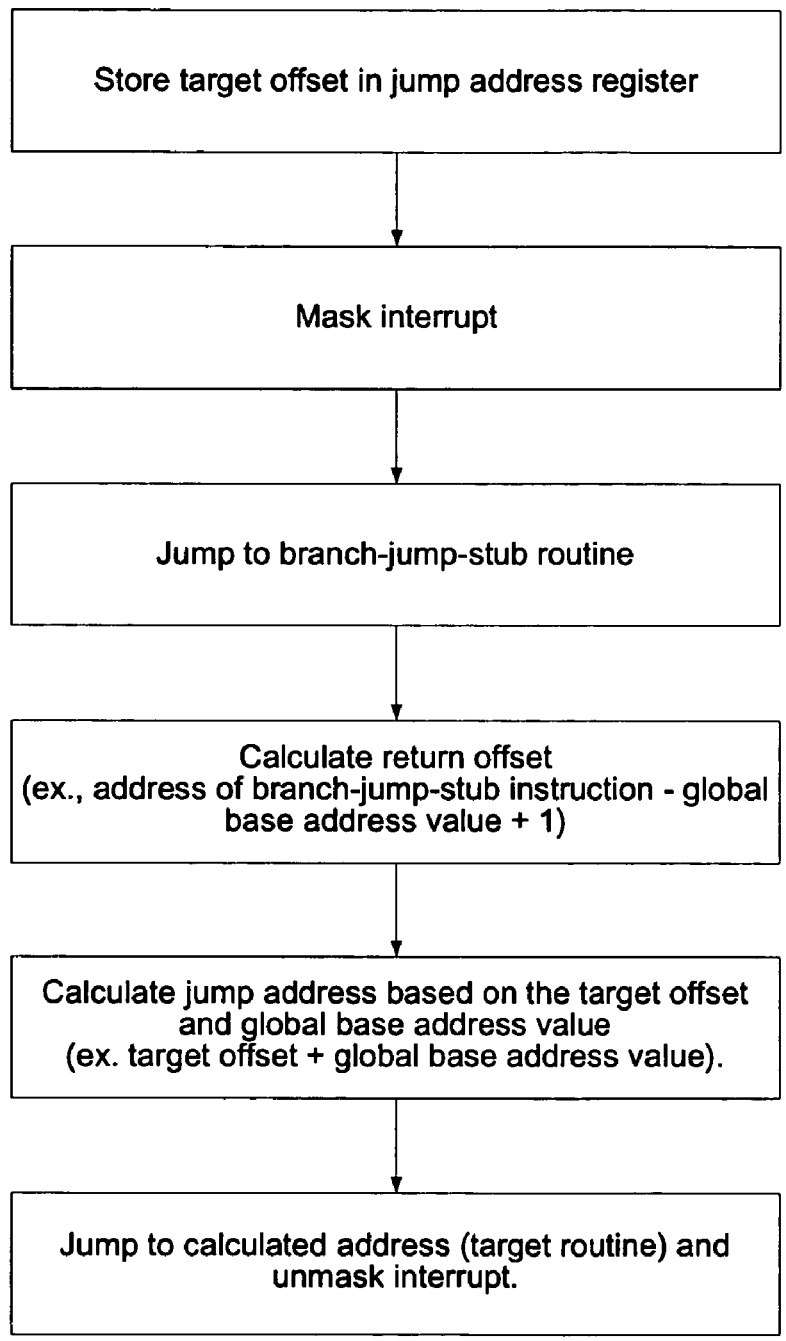
FIG. 7 is a flowchart of a branch-jump-stub in accordance with an aspect of the present invention.

An operation in accordance with one or more aspects of the invention will now be described, starting with the execution of branch-jump-stub instruction 700. An operation of the invention is also shown in the figures, including FIG. 7. Using the example of FIG. 4, when the branch-jump-stub instruction 700 is loaded from memory address 1400 of memory 250, the SPU performs a series of steps associated with the instructions. The steps may be stored in a stub routine in ROM, local memory 250 or some other memory accessible by the processor. Alternatively, some of the steps may be stored in ROM and the remainder may be stored in local memory 250. For example, when an instruction (such as branch-jump-stub instruction 700 or return-jump-stub instruction 720) causes a jump to stub or routine which manages the offset adjustment with respect to the base address (discussed below and such as branch-jump-stub routine 670 or return-jump-stub routine 671), the instruction may be coded into the task code whereas the routine may be coded as a subroutine independent of the task code. The latter alternative shall be assumed herein for the purpose of illustration and not by limitation.

When the processor executes the branch-jump-stub instruction, the first step is to store the target offset value of 600 in jump address register 810. Next, the value of interrupt mask register 820 is set so as to prevent transfer of the task 680 to a different SPU 208 or memory location in response to an interrupt. (If an interrupt occurs while it is masked, the processor will not take the interrupt—if at all—until interrupt is unmasked.)

The processor then jumps not to the intended target routine of the branch-jump-stub instruction, but rather to another set of instructions which provide additional steps associated with the branch-jump-stub instruction. As shown in FIG. 4, these instructions are stored in local memory 250 as branch-jump-stub routine 670. Preferably, the branch-jump-stub routine is always stored in the same fixed physical address location, such as address 500 of local memory 250.

Branch-jump-stub routine 670 calculates the return offset to be used when returning from the routine targeted by the branch-jump-stub instruction. In one aspect of the invention, the return offset is calculated based on the global base address value and the instruction following the address of the branch-jump-stub instruction. For example, the return offset may be calculated by the following equation: return offset=(address of branch-jump-stub instruction)−(global base address value)+1. Using the sample values of FIG. 4, the return offset would be 401 (1400−1000+1). The return offset value is then stored in return address register 830.

As discussed further below, once the return offset value is stored in the return address register 830, the task image 680 may be moved safely to another memory location. Accordingly, the value of the interrupt mask register 820 may be changed to indicate that such interrupts are now unmasked.

After the interrupt is unmasked, the branch-jump-stub routine causes the processor to jump to the target routine 710 by calculating an address based on the target offset and global base address value, storing it in a register and then jumping to the value stored in the register. The physical target address of the target routine is preferably calculated by adding the target offset to the global base address value. Accordingly, in accordance with one aspect of the invention, the final instructions of the branch-jump-stub routine are to calculate the physical target address and then perform a jump to the instructions at that address. Using the sample data of FIG. 4, the physical address of target routine 710 would be determined to be 1600 (which equals 600+1000). The process will then execute the instructions of the target routine 710.

In one aspect of the invention, the steps of storing the target offset in the jump address register, masking the interrupt and jumping to the branch-stub-routine replaces or supplements the typical branch instruction. In one embodiment, the SPU automatically executes these steps upon receipt of a branch-jump-stub instruction. In another embodiment, each of the steps is individually coded into the task code.

Figure 8:
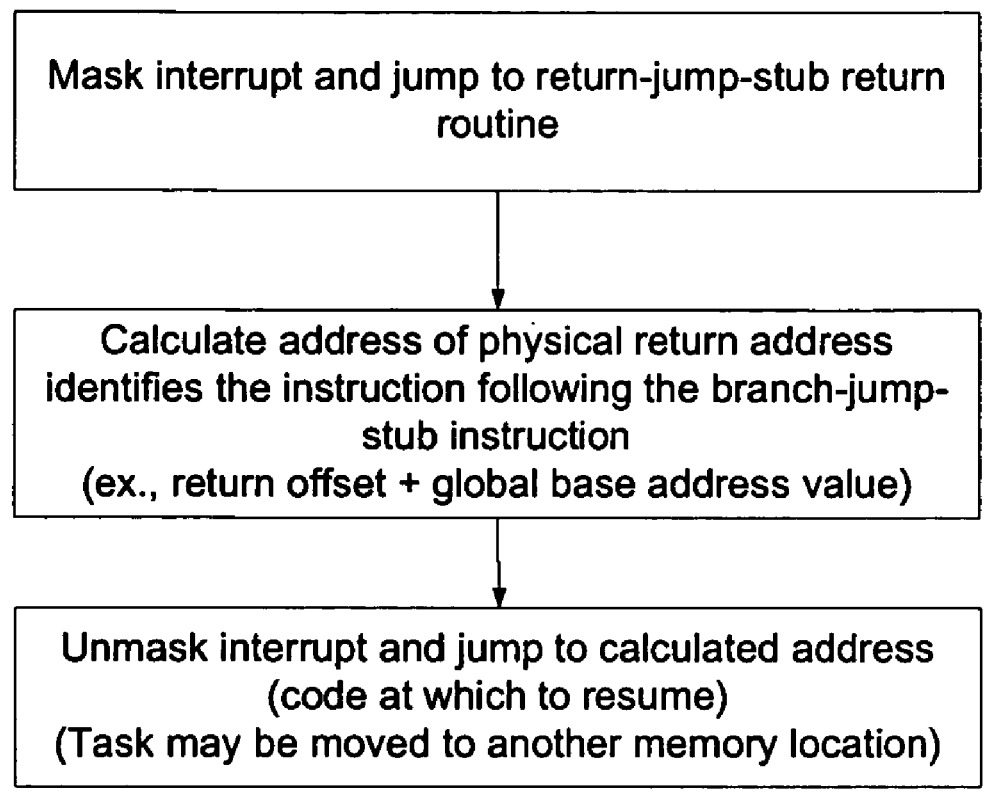
FIG. 8 is a flowchart of a return-jump-stub in accordance with an aspect of the present invention.

If the target routine is a subroutine, the last instruction of the target routine is preferably a return-jump-stub instruction 720. An example of an operation associated with the return-jump-stub instruction is also shown in FIG. 8. Similar to the branch-jump-stub instruction, the return-jump-stub instruction 720 causes the processor to jump to a routine 671 which calculates the physical address of the next instruction to be executed. However, whereas the branch-jump-stub routine 670 calculates the physical address of the target routine, the return-jump-stub routine 671 calculates the physical address of the instruction to return to now that the target routine 710 has completed execution. Preferably, the return-jump-stub instruction does not take any parameters, which indicates that the processor should return to the point of the task that was executing at the time of the jump to the target routine. Alternatively, the return-jump-stub instruction may include a parameter which provides additional addressing information.

Upon encountering a return-jump-stub instruction 720 and before jumping to the return-jump-stub routine 671, the processor will mask the interrupt to prevent task image 680 from being moved to another memory location. Although the return-jump-stub routine is shown in FIG. 4 as being stored in memory 250, the return-jump-stub routine—like the branch-jump-stub routine—may also be completely or partially stored in a ROM or other memory such that SPU 280 executes the operations of the return-jump-stub routine without accessing additional instructions in memory 250.

Preferably, the switching between interrupt enabled and disabled is performed by an option in certain branch instructions such as branch-jump-stub instructions or return-jump-stub instructions, so that interrupt masking and unmasking and branching is optionally provided as an atomic instruction in order to resume from a context switch. In accordance with such preference, the processing of masking and interrupting interrupts may occur simultaneously, momentarily before or momentarily after the step of jumping. Preferably, the unmasking operation takes place prior to the next instruction (the instruction to be executed upon resuming) is executed. Moreover, interrupt masking can occur prior to calling the branch.

In one aspect of the invention, the step jumping to the masking the interrupt and jumping to the return-stub-routine replaces or supplements the typical return instruction. In one embodiment, the SPU automatically executes these steps upon receipt of a return-jump-stub instruction. In another embodiment, each of the steps is individually coded into the task code.

Return-jump-stub routine 670 calculates the physical return address. Preferably, the physical return address identifies the instruction immediately following the branch-jump-stub instruction associated with this return instruction. In one aspect of the invention, the return-jump-stub routine causes the processor to calculate the physical return address in accordance with the following equation: physical return address=return offset+global base address value. Using the sample values of FIG. 4, the physical return address would thus be 1401 (which equals 401+1000).

Once the physical return address is calculated, the interrupt will be unmasked to allow the task image 680 to be moved to another location. The task jumps to the instruction at the physical address, preferably simulataneously with the interrupt unmasking.

The static data 620 is similarly accessed by the use of offsets. For example, static data 620 may be accessed by data moving instructions of the form "MOVE Ax, Offset", where Ax represents the register into which the data is moved, and Offset represents the offset value used to determine the physical address of the data. As with the instructions, the offsets for accessing static data 620 are preferably added to the global base address value to determine the physical address. Preferably, one or more of the load and storing instructions of the SPU allows addressing based on summing a resister value with the offset parameter, as known in many RISC architectures.

The heap 630 may contain arrays and be accessed by the use of pointers. In accordance with one aspect of the invention, the arrays and pointers associated with heap 630 are accessed by the use of offsets. Indeed, all of the pointers may be stored as pointer offsets, including the pointers in the heap itself. Using the sample information contained in FIG. 4, the heap 630 contains a variety of data objects 635-637 representing cars on a race track, such as their position on the track and color. Task instructions 610 access the car information by first accessing an array 631 containing pointers, where each pointer points to one of the data objects.

The array 631 in the heap 630 may be accessed with the use of an offset as described above in addition to the array element position. In one aspect of the invention, the physical address of the array element is determined by adding the value stored in the global base address register to the offset stored in the instruction 610 pointing to the array, and then adding the desired array element. Using the sample data contained in FIG. 4, move instruction 705 accesses the second element 632 in array 631 by adding the global address value (1000) to the offset value (2005) stored in the move instruction, and then adding the desired array element (2), i.e., the physical address of 3007. In this regard, the information may be accessed by using addressing instructions that accept register and index values and sum them together; more complex addressing may require extra steps to calculate the address (e.g., array or struct data).

Once a pointer is retrieved from array 631, the pointer may be used to access the data stored in heap 630. However, the pointer does not point to a physical address. Rather, each pointer in or to the heap 630 is preferably stored as an offset value based on the global base address value. For example, when pointer 632 is used to access data in heap 630, the physical address that is the target of the pointer may be calculated by adding the value stored in the pointer (2200) to the global base address (1000) to determine the physical address (3200) of the second car associated with the array 631

Similarly, pointers to and within the stack 640 are also stored as offsets. For example, the stack may contain pointers to the car data 635-637, and such pointers are stored as offsets.

If all of the categories of data are stored contiguously, one global offset register may be required. However, it is also possible to store and load the task image in separate sections, with separate global base addresses for each section, in order to provide a finer grain of memory management. For example, if the heap is managed with different base address, a heap address register may be provided to manage the pointers to heap data. Alternatively, a management program may be provided to process more complicated addressing where there are many base addresses.

Figure 6:
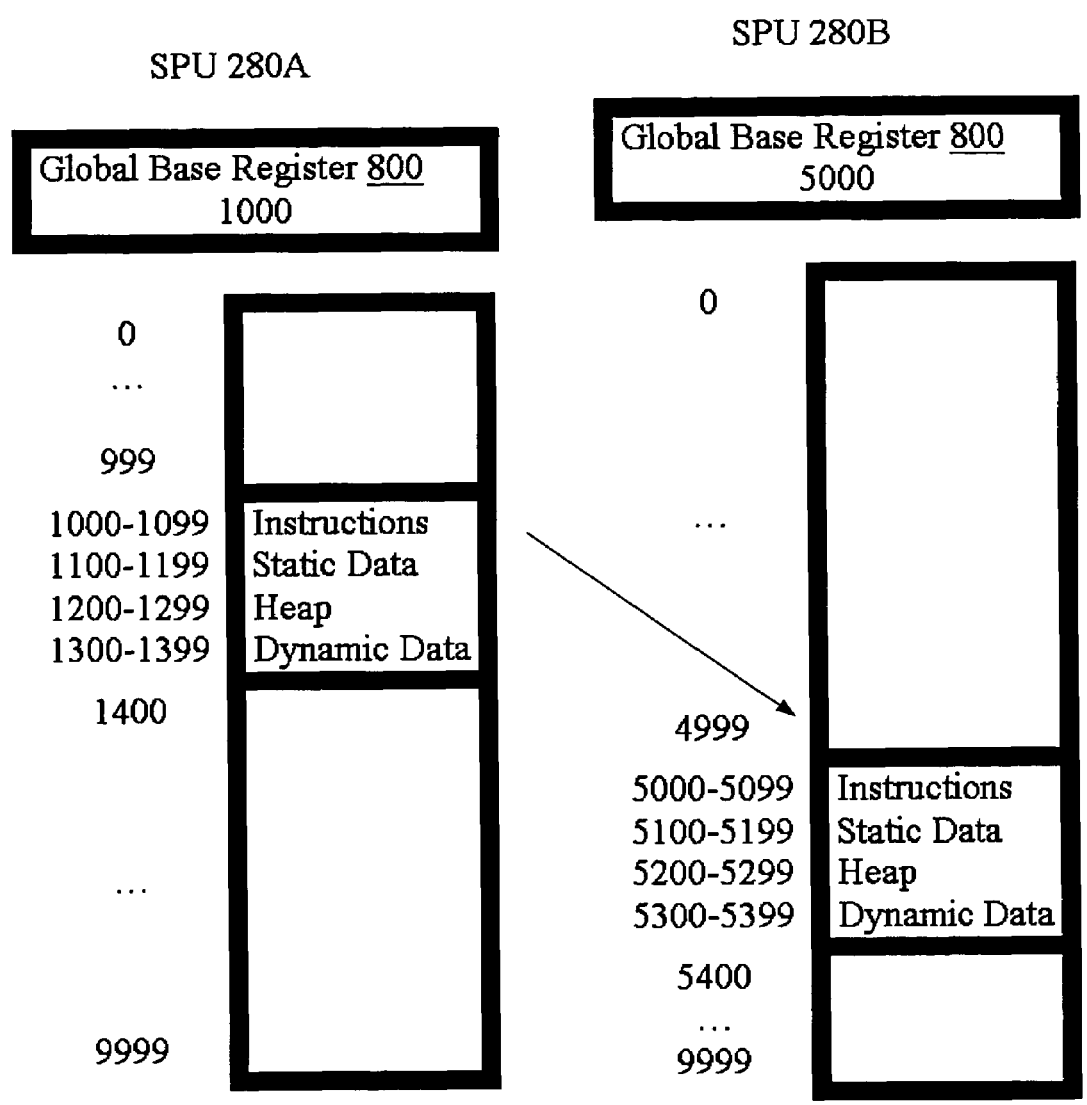
FIG. 6 is a schematic diagram of task being moved to another SPU in accordance with an aspect of the present invention.

Another aspect of the invention allows the entire task image, including its dynamic data, to be easily moved in the middle of its execution without changing any of the address pointers within the task image. FIG. 6 illustrates the task being moved from SPU 280A to SPU 280B. Because all of the task image's addresses are stored as offsets with respect to the global base address value, there is no need to change any of the address information contained in the instructions 610, statically allocated data 620, heap 630 or stacks 640. Rather, the task image data may be copied as is to any other address space.

As shown by way of example in FIG. 6, the instructions and data may be copied from address space 1000-1399 from SPU 280A to address space 5000-5399 of SPU 280B in a manner such that whatever was at address X in SPU 280A is now at address X+4000 in SPU 280B. There is no need to change any of the information contained in task image data.

Before or after the task instructions and data are transferred, the global base address of the destination SPU 280B is set equal to the lowest address of the newly-transferred task image. For example, the value of global register 800 of SPU 280B will be changed to 5000.

When the task image is transferred, it is also preferable to transfer the values of the jump address register and return address register from SPU 280A to SPU 280B. The transfer of this information allows the task image to be transferred without change even if the task was just about to jump to or from a target routine at the time of transfer.

It is not necessary for the architecture to provide a dedicated jump address register. Rather, an aspect of the invention may be implemented by using a general purpose register to hold the various addresses to be jumped to.

Accordingly, even if the task is in the middle of execution, all of its instructions and data can be seamlessly migrated to another processor without changing any of the address information contained in the task or data. Rather, when the program resumes operation, the only required change is to change a single register containing the global base address value and, preferably, the jump and return address registers. Preferably, all of the registers are part of the processor context to be preserved when preempted.

Another advantage of various aspects of the invention is their ability to be executed on processors and hardware lacking the ability to implement virtual memory. This is particularly so with respect to SPUs having small local memory stores and requiring explicit management of memory by software.

The sample operations described herein need not take place in the precise order set forth above. Rather, many aspects of the invention permit considerable flexibility with respect to the order in which its steps are executed, such as whether the return offset is calculated before or after the physical address of the target routine is calculated.

Unless stated to the contrary, use of words such as "including," "containing," "such as," "comprising" and the like, means "including without limitation" and shall not be construed to limit any general statement that it follows to the specific or similar items or matters immediately following it. References to a "plurality" of things means at least two of the things, and, unless stated to the contrary, reference to "a" or "one" thing does exclude the possibility of using a plurality of such things.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A method of processing a task comprising:
providing instructions stored in addressable memory, wherein the instructions comprise a jump instruction to a target routine, a return instruction within the target routine, and a subsequent instruction to be executed after the target routine is executed,
providing a first base value related to the addresses at which the instructions are stored,
processing the jump instruction by determining a return value based on the base value and address of the jump instruction, storing the return value, determining the address of the target instruction based on the parameter value and base value, and jumping to the address of the target routine,
changing the addresses at which the instructions are stored and storing a second base value related to the changed addresses,
after the addresses of the instruction are changed, processing the return instruction by determining the address of the subsequent instruction based on the return value and the second base value and jumping to the address.

2. The method of claim 1 wherein the return offset is determined by subtracting the base value from the parameter.

3. The method of claim 1 comprising preventing the step of changing the addresses at which the instructions are stored during the step of processing the jump instruction.

4. The method of claim 3 wherein the preventing step comprises masking an interrupt request to change the address location of the instructions.

5. The method of claim 1 further comprising:
providing a first data base value different from the first and second base value; creating dynamic data in response to the execution of the instructions, wherein pointers to the data are stored as offsets from the first data base value; changing the addresses at which the dynamic data is stored but not the values of the pointers; storing a second data base value related to the changed addresses; after the addresses of the dynamic data are changed, processing the data access instructions by determining the address of the data based on the pointer value and the second data base value.

6. A system for processing a task comprising:
a plurality of sub-processing units,
instructions executable by the sub-processing unit,
a global base address register for each sub-processing unit, the global base address register storing a global base value,
static data comprising data accessed by a sub-processing unit in response to the instructions and whose values are stored prior to the execution of the instructions,
dynamic data comprising data accessed by a sub-processing unit in response to the instructions and whose values are not stored prior to the execution of the instructions,
jump instructions having parameters, wherein the parameters are independent of the physical address of the instruction to jump to, and
data pointers having parameters, wherein the parameters are independent of the physical address of the data to be accessed,
wherein the jump instructions and data pointers are resolved based on the parameters and the global address value, and wherein moving the instructions from one processor to another processor comprises changing the global base value but not the parameters.

7. The system of claim 6 further comprising a return address register for storing a value related to an address to return to after execution of a routine that was jumped to.

8. The system of claim 6 further comprising an interrupt mask value indicating whether the memory address of the instructions can be changed.

9. The system of claim 6 wherein the instructions are stored in a local memory uniquely associated the subprocessing unit.

10. The system of claim 6 wherein the dynamic data includes a heap and a stack.

11. The system of claim 6 wherein at least some of the pointers are stored as parameters in data access instructions and at least some of the pointers are stored in the dynamic data.

12. The system of claim 11 wherein all of the data pointers created in response to execution of the instructions are contain parameters that are independent of the physical address of the data to be accessed.

13. A method of processing tasks comprising,
storing instructions in an addressable memory accessible by a first processor, the instructions having a first subset of instructions and a second subset of instructions whereby the second subset of instructions access data created by the first subset,
storing a first base value that is related to the physical addresses in which the instructions are stored,
the first processor executing the first subset of the instructions and creating dynamic data in response to such execution, wherein the dynamic data includes a pointer value pointing to target dynamic data,
the first processor accessing the target dynamic data by determining the physical address of the target data based on the first base value and the pointer value,
after the first subset of instructions are executed, storing the instructions and dynamic data in an addressable memory accessible by a second processor without changing the pointer values, and
the second processor executing the second subset of instructions and accessing the target dynamic data based on the second base value and the pointer value.

14. A system of processing a task comprising:
instructions stored in addressable memory, wherein the instructions comprise a jump instruction to a target routine, a return instruction within the target routine, and a subsequent instruction to be executed after the target routine is executed,
means for providing a first base value related to the addresses at which the instructions are stored,
means for processing the jump instruction by determining a return value based on the base value and address of the jump instruction, storing the return value, determining the address of the target instruction based on the parameter value and base value, and jumping to the address of the target routine, and
means for changing the addresses at which the instructions are stored and storing a second base value related to the changed addresses, such that after the addresses of the instruction are changed, the return instruction is processed by determining the address of the subsequent instruction based on the return value and the second base value and jumping to the address.

15. The system of claim 14 wherein the return offset is determined by subtracting the base value from the parameter.

16. The system of claim 15 further comprising means for preventing the step of changing the addresses at which the instructions are stored during the step of processing the jump instruction.

17. The system of claim 16 wherein the means for preventing comprises means for masking an interrupt request to change the address location of the instructions.

18. The system of claim 15 further comprising: means for providing a first data base value different from the first and second base value; means for creating dynamic data in response to the execution of the instructions, wherein pointers to the data are stored as offsets from the first data base value; means for changing the addresses at which the dynamic data is stored but not the values of the pointers; means for storing a second data base value related to the changed addresses; means for processing the data access instructions by determining the address of the data based on the pointer value and the second data base value after the addresses of the dynamic data is changed.

19. A system for processing tasks comprising:
a first processor;
a first memory associated with the first processor;
a first base register containing a value related to the physical address location of the task image when loaded in the first memory;
a second processor;
a second memory associated with the second processor;

a second base register containing a value related to the physical address location of the task image when loaded in the second memory;

a task image comprising jump instructions having parameters, data access instructions having parameters, static data created prior to execution of the instructions by the first processor, a heap created in response to execution of the instructions by the first processor and comprising parameters, and a stack, wherein the parameters depend on the location of instructions or data; and an address resolution routine executed in response to the execution of a jump instruction or data access instruction, the address resolution routine for determining a physical address based on the register value associated with the processor executing the instructions or accessing the data, and the parameter of the jump instruction or data access instruction;

wherein the task image, including the parameter values as stored in the first memory, is copied from the first memory to the second memory in response to an interrupt request.

20. The system of claim 19 further comprising an interrupt mask register containing a mask value indicating whether the task image may be copied from the first memory to the second processor in response to an interrupt, wherein the interrupt is masked during at least a portion of the address resolution routine.

21. The system of claim 20 wherein the address resolution routine further comprises instructions for calculating a return value based on the address of the jump instruction and the value of the first or second base register depending on whether the first or second processor is executing the jump instruction; and a return address resolution routine executed in response to the execution of a return instruction for determining the physical address of the instruction to be executed after the jump instruction, the physical address being determined based on the return value and the value of the first or second base register depending on whether the first or second processor is executing the return instruction.

22. The system of claim 20 further comprising a third processor for copying the task image from the first memory to the second memory in response to an interrupt request.

23. The system of claim 22 wherein the third processor is a processing unit and the first and second processors are subprocessors.

24. A system for processing a task comprising:

instructions stored in an addressable memory, wherein the instructions comprise a jump instruction to a target routine, a return instruction within the target routine, and a subsequent instruction to be executed after the target routine is executed;

a stored first base value related to the addresses at which the instructions are stored;

at least one processor to:

process the jump instruction by determining a return value based on the first base value and address of the jump instruction, storing the return value, determining the address of the target instruction based on the parameter value and first base value, and jumping to the address of the target routine;

change the addresses at which the instructions are stored and storing a second base value related to the changed addresses; and after the addresses of the instructions are changed, process the return instruction by determining the address of the subsequent instruction based on the return value and the second base value and jumping to the address.

25. The system of claim 24, wherein the return offset is determined by subtracting the base value from the parameter.

26. The system of claim 24 wherein said at least one processor prevents the change of the addresses at which the instructions are stored by masking an interrupt request.

27. The system of claim 24 further comprising:

a first data base value different from the first and second base value; and wherein said at least one processor is further operable to:

create dynamic data in response to the execution of the instructions, wherein pointers to the data are stored as offsets from the first data base value;

change the addresses at which the dynamic data is stored but not the values of the pointers;

store a second data base value related to the changed addresses;

process data access instructions by determining the address of the data based on the pointer value and the second data base value after the addresses of the dynamic data are changed.

* * * * *

UNITED STATES PATENT AND TRADEMARK OFFICE
CERTIFICATE OF CORRECTION

PATENT NO. : 7,437,536 B2
APPLICATION NO. : 10/838050
DATED : October 14, 2008
INVENTOR(S) : Tatsuya Iwamoto It is certified that error appears in the above-identified patent and that said Letters Patent is hereby corrected as shown below:

Column 1, line 23, after "is", insert --to--.

Column 2, line 29, "permits" should read --permit--.

Column 3, line 21, "value;" should read --values--.

Column 3, line 55, after "may", insert --be--.

Column 4, line 66, "value;" should read --values--.

Column 6, line 33, "its" should read --their--.

Column 9, line 13, "is" should read --are--.

Column 12, line 13, "is" should read --are--.

Column 12, line 54, "allows" should read --allow--.

Column 15, line 11, "value" should read --values--.

Column 15, line 51, after "associated", insert --with--.

Column 15, line 51, "subprocessing" should read --sub-processing--.

Column 16, line 35, "instruction" should read --instructions--.

Column 16, line 50, "value" should read --values--.

Column 18, line 50, "value" should read --values--.

Signed and Sealed this

Twenty-fourth Day of November, 2009

David J. Kappos
*Director of the United States Patent and Trademark Office*